US006705169B2

(12) United States Patent
Textor

(10) Patent No.: US 6,705,169 B2
(45) Date of Patent: Mar. 16, 2004

(54) PRESSURE MEDIATOR WITH MODULE FOR DETECTING BROKEN DIAPHRAGMS, AND MODULE FOR DETECTING BROKEN DIAPHRAGMS

(75) Inventor: Olaf Textor, Loerrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 52 days.

(21) Appl. No.: 10/339,653

(22) Filed: Jan. 10, 2003

(65) Prior Publication Data

US 2003/0154794 A1 Aug. 21, 2003

(51) Int. Cl.$^7$ ................................................ G01L 7/08
(52) U.S. Cl. ....................................................... 73/715
(58) Field of Search ................................... 73/700, 715

(56) References Cited

U.S. PATENT DOCUMENTS

| 6,269,828 B1 | * | 8/2001 | Kilgore et al. | ................. | 137/14 |
| 6,286,486 B1 | * | 9/2001 | Robinson et al. | ........... | 123/457 |
| 6,334,460 B1 | * | 1/2002 | Hem | .......................... | 137/508 |

FOREIGN PATENT DOCUMENTS

DE          19949831 A1 *    4/2001      ............. G01L/7/08

* cited by examiner

*Primary Examiner*—Edward Lefkowitz
*Assistant Examiner*—Andre Allen
(74) *Attorney, Agent, or Firm*—Jones, Tullar & Cooper, P.C.

(57) ABSTRACT

A pressure mediator includes a base body; a divider diaphragm system having a first divider diaphragm and a second divider diaphragm, between which an intermediate chamber is enclosed in pressuretight fashion, in which the first surface of the first divider diaphragm, remote from the intermediate chamber, can be acted upon by the pressure prevailing in the first medium, and the first surface of the second divider diaphragm, remote from the intermediate chamber, is oriented toward the base body and is secured by its peripheral region to the base body, forming a pressure chamber between the base body and the second divider diaphragm, and the pressure chamber can be filled with the second medium and has a pressure chamber opening, through which the pressure can be transmitted by means of the second medium, and an exertion of pressure of the first divider diaphragm can also be transmitted to the second divider diaphragm via the intermediate volume; and having a sensor, for monitoring a property of the intermediate chamber, characterized in that the pressure mediator furthermore has a diaphragm module, which includes a pressure chamber, to which the first divider diaphragm is secured by its peripheral region, and the diaphragm module is secured to the base body by means of the module body.

10 Claims, 2 Drawing Sheets

Figure 1:
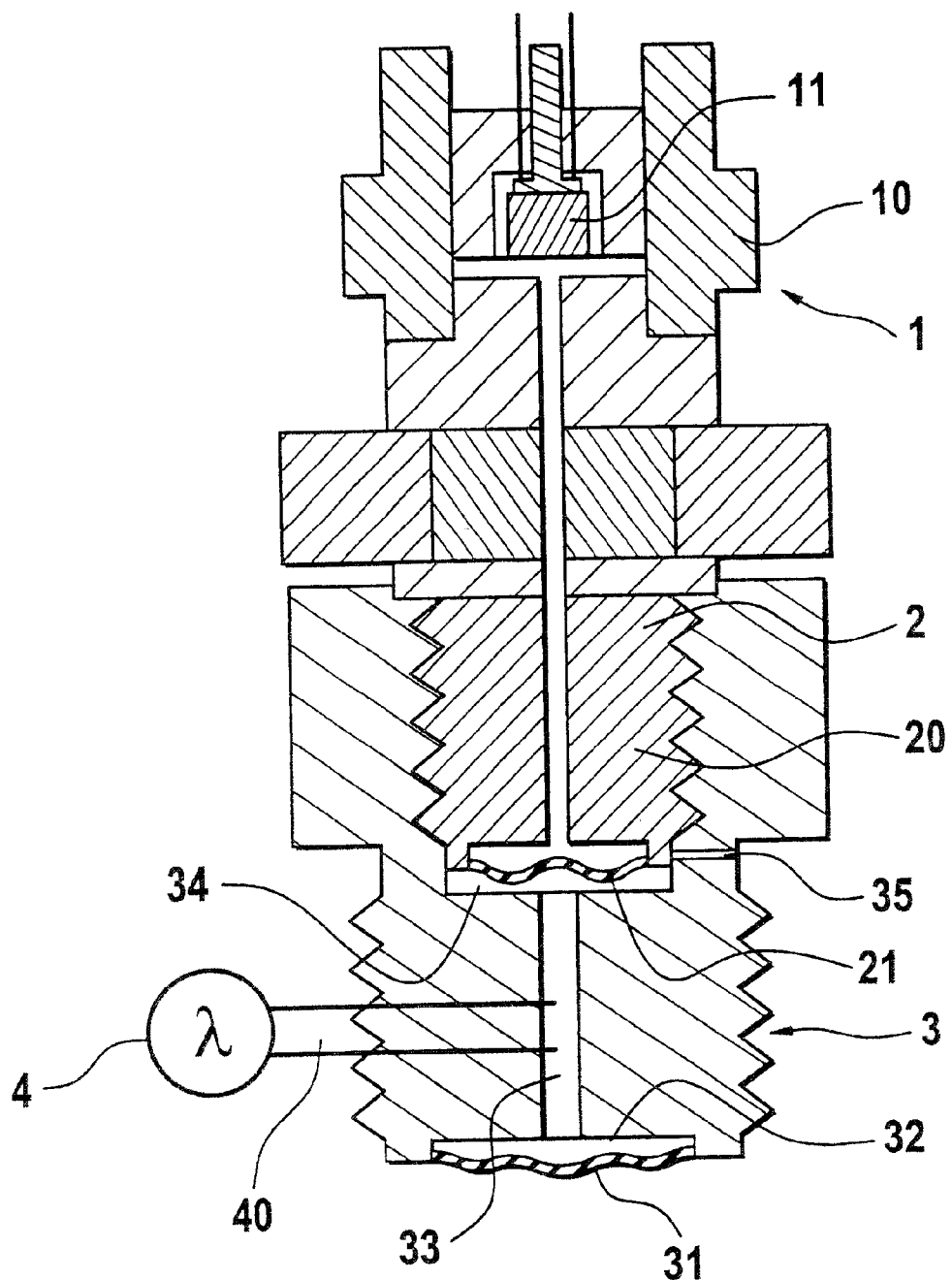

PRESSURE MEDIATOR WITH MODULE FOR DETECTING BROKEN DIAPHRAGMS, AND MODULE FOR DETECTING BROKEN DIAPHRAGMS

TECHNICAL FIELD

The invention relates to a pressure mediator for transmitting a pressure of a pressure prevailing in a first medium to a second medium.

BACKGROUND OF THE INVENTION

More precisely, the invention relates to a pressure mediator having a base body; a divider diaphragm system having a first divider diaphragm and a second divider diaphragm, between which an intermediate chamber is enclosed in pressuretight fashion, in which the first surface of the first divider diaphragm, remote from the intermediate chamber, can be acted upon by the pressure prevailing in the first medium, and the first surface of the second divider diaphragm, remote from the intermediate chamber, is oriented toward the base body and with the base body forms a pressure chamber, which can be filled with the second medium and has a pressure chamber opening, through which the pressure can be transmitted by means of the second medium, and an exertion of pressure of the first divider diaphragm can also be transmitted to the second divider diaphragm via the intermediate volume; and having a sensor, for monitoring a property of the intermediate chamber.

Among other uses, pressure mediators are used in measuring pressure in aggressive media; the divider diaphragm is subjected to an aggressive first medium, and the pressure prevailing in the first medium is transmitted to a second medium in the pressure chamber, from where it is delivered to a pressure measuring cell via a suitable pressure supply line. A pressure transmission with a pressure mediator and a pressure line connected to it can, however, also be desired with nonaggressive media, in order to span long distances between the first medium and the site of the pressure measuring cell, or in order to keep a pressure measuring cell far away from the high temperatures of the first medium.

For pressure transmission, incompressible oils are preferably used as the second medium. To the extent that such a medium is capable of contaminating a measurement medium, and for various other reasons, it is necessary for a leak or break in the divider diaphragm or a divider diaphragm system to be detected early.

To this end, Wiegand et al., in German Patent Disclosure DE 199 49 831A1, disclose a generic pressure mediator in which the first diaphragm and the second diaphragm have the same design, and the intermediate chamber is evacuated. The sensor for monitoring a property of the intermediate chamber is a simple pressure sensor, which detects a leak in the diaphragm system from a change in pressure in the intermediate chamber.

In the unpublished German Patent Application 101 44230.0 of Bernauer et al, a pressure measuring instrument with a generic pressure mediator is disclosed in which the intermediate chamber between the first diaphragm and the second diaphragm is filled with a liquid or a solid. A leak in the diaphragm system can then be detected for instance from a change in the consistency of the liquid or from the penetration of the first or second medium into the intermediate chamber, on the basis of a change in the dielectric properties, the conductivity, or the optimal properties, by means of a suitable sensor. The arrangement of Bernauer et al. is advantageous in the sense that less-pronounced hysteresis effects are expected than in the diaphragm system of the teaching of Wiegand et al., because the forces of friction between the corrugated diaphragms resting directly on one another should be greater than the forces of gravity that occur between diaphragms spaced apart from one another in the event of deflections. This is particularly the case if the intermediate chamber is filled with liquid.

The devices described above meet the purpose of being capable of detecting a diaphragm break, but the equipment described above requires complete retrofitting of the measurement sites already in operation. Furthermore, the many kinds of pressure measuring applications would require a large number of different pressure mediators with the diaphragm systems described, with two divider diaphragms, in order to suitably meet existing conditions. This means a very high production cost.

SUMMARY OF THE INVENTION

It is therefore the object of the present invention to furnish a pressure mediator of this generic type which overcomes the described disadvantages of the prior art.

This object is attained according to the invention by a pressure mediator including: a base body; a divider diaphragm system having a first divider diaphragm and a second divider diaphragm, between which an intermediate chamber is enclosed in pressuretight fashion, in which the first surface of the first divider diaphragm, remote from the intermediate chamber, can be acted upon by the pressure prevailing in the first medium, and the first surface of the second divider diaphragm, remote from the intermediate chamber, is oriented toward the base body and is secured by its peripheral region to the base body, forming a pressure chamber between the base body and the second divider diaphragm, and the pressure chamber can be filled with the second medium and has a pressure chamber opening, though which the pressure can be transmitted by means of the second medium, and an exertion of pressure of the first divider diaphragm can also be transmitted to the second divider diaphragm via the intermediate volume; and having a sensor, for monitoring a property of the intermediate chamber, characterized in that the pressure mediator furthermore has a diaphragm module, which includes a pressure chamber, to which the first divider diaphragm is secured by its peripheral region, and the diaphragm module is secured to the base body by means of the module body.

The sensor for monitoring a property of the intermediate chamber can be disposed both on the base body and on the diaphragm module.

Particularly in diaphragm modules for retrofitting pressure mediators without monitoring for broken diaphragms, the sensor for monitoring a property of the intermediate chamber is preferably disposed on the diaphragm module. In a modular version of pressure mediators of the invention, the sensor can be disposed both on the base body and on the sensor module; mounting the sensor on the base body is currently preferred at least whenever the pressure mediator is a component of a pressure measuring instrument or differential pressure measuring instrument with a pressure measuring cell, since in that case the requisite connections of the sensor can easily be extended into the electronics housing of the pressure measuring instrument.

As detection principles, all the principles named above for monitoring broken diaphragms can be employed; at present, a capacitive or conductive monitoring of a liquid in the intermediate chamber is preferred.

For diaphragm modules for retrofitting on pressure mediators with a process connection, it is recommended that the diaphragm module, on its side toward the pressure mediator, have a connection that is complementary to the process connection, and a corresponding process connection on the side toward the process. In new construction of pressure mediators of the invention, modules with different process connections can be secured to the base body via a uniform module connection.

In terms of the embodiment of the diaphragm modules, these may among other have a diaphragm bed for the first divider diaphragm and optionally a separate overload mechanism.

The first divider diaphragm can have the same geometric dimensions as the second divider diaphragm, but in principle other dimensions are also possible. For reducing the overall rigidity of the divider diaphragm system, the second divider diaphragm can have a considerably thinner material thickness as well as more-favorable materials than the first divider diaphragm, since the second divider diaphragm no longer comes into contact with corrosive media.

If the geometric conditions allow this, the second divider diaphragm can have a larger diameter than the first divider diaphragm, so that for a given material thickness, the diaphragm forces for the requisite lifting volume of the diaphragm can be minimized.

The diaphragm module should preferably be detachably connected to the base body, so that it can be replaced easily after a diaphragm has broken.

BRIEF DESCRIPTION OF THE INVENTION

The invention will be described in further detail in conjunction with the following drawings. Shown are;

FIG. 1: which is a sectional view of a preferred embodiment of a pressure measuring instrument with a pressure mediator according to the invention.

Figure 2:
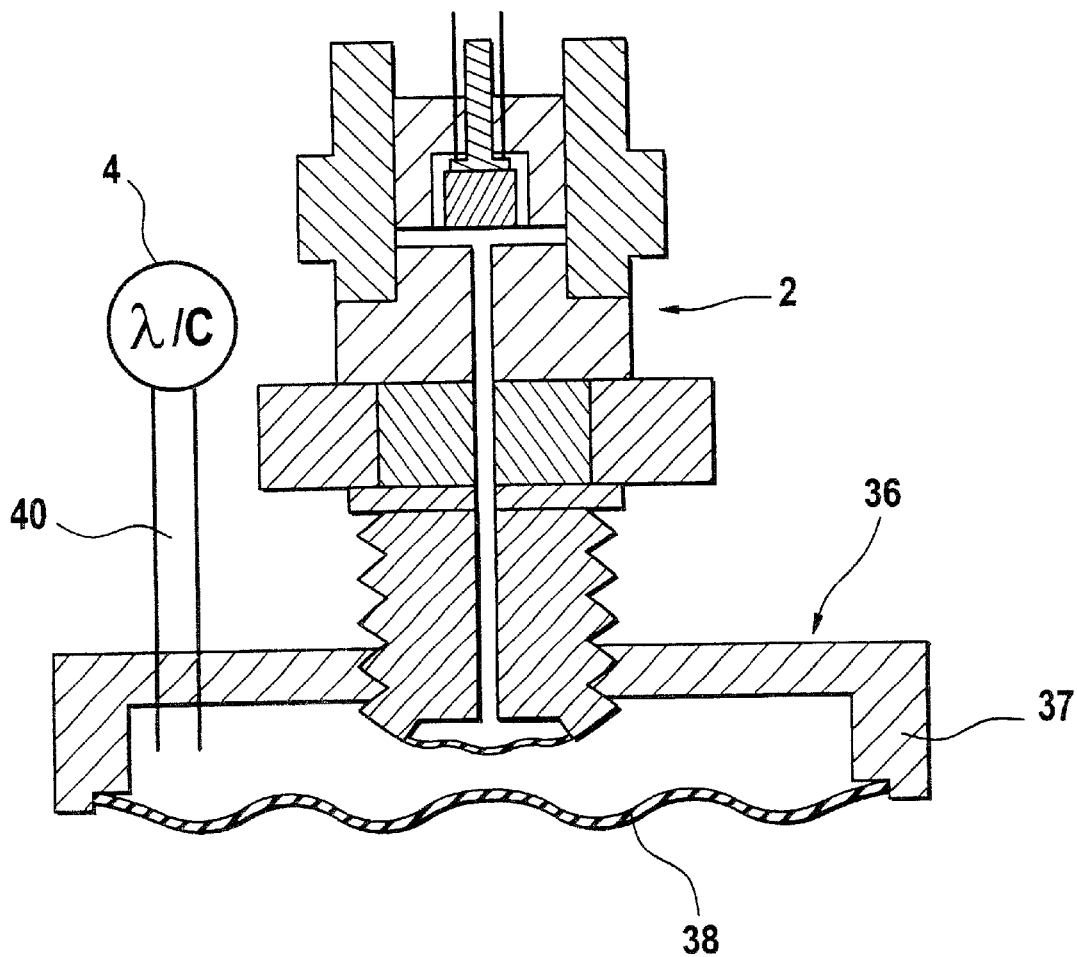

FIG. 2: which is a further preferred embodiment of a pressure mediator of the invention.

DESCRIPTION OF THE PREFERRED EMBODIMENT

One exemplary embodiment of a pressure mediator of the invention will now be explained in conjunction with FIG. 1.

The pressure measuring instrument 1 includes a measurement cell 11 in the sensor chamber 12 of a housing 10, in which chamber the measurement cell 10 is acted upon by a measurement pressure. The measurement pressure is delivered to the measurement cell 10 via a pressure mediator 2, which has an essentially cylindrical base body 20 and a second divider diaphragm 21. The second divider diaphragm 21 is secured, preferably via a diaphragm bed, to the face end, remote from the housing 10, of the base body 20, thus enclosing a second diaphragm volume. This second diaphragm volume communicates with the sensor chamber 12 via a capillary line through the base body 20, and the second diaphragm volume, sensor chamber 12, and capillary line are filled with a hydraulic fluid, so that exertions of pressure on the divider diaphragm 21 can be transmitted to the measurement cell. The base body 20, on its jacket face, has a thread with which it can be screwed into suitable connections. Thus far, this involves a pressure measuring instrument with a pressure mediator in accordance with the prior art. In order for this measuring instrument to be equipped with a diaphragm breakage monitor, a diaphragm module 3 is screwed in front of the pressure mediator 2, which diaphragm module has a substantially cylindrical module body 30 and a first divider diaphragm 31 that, preferably via a diaphragm bed 32, enclosing a first diaphragm volume, is secured to the face end of the module body 30 remote from the pressure mediator 2. On the face end of the module body 30 oriented toward the pressure mediator 2, a recess is provided, which has at least the surface area of the second divider diaphragm 21 and is axially aligned with it. Because the diaphragm module 3 and the pressure mediator 2 are screwed together in pressuretight fashion, a pressure chamber 34 forms between them, which is bounded by the second divider diaphragm 21 and by the recess. The pressure chamber 24 communicates with the first diaphragm volume via a conduit 33, which extends through the module body 30. The pressure chamber 34, conduit 33, and first diaphragm volume are filled with a transmission medium, in particular a hydraulic oil, so that an exertion of pressure on the first divider diaphragm is transmitted to the second divider diaphragm.

The module body 30 preferably has an oil overflow 35, which when the module body 30 is screwed to the base body 20 allows excess oil to flow out. The conduit is not closed off in pressuretight fashion until the screw connection of the two parts has reached its final seat. As a result of this construction, it is possible to mount a diaphragm module 3 without complicated and expensive filling systems.

Finally, the diaphragm module 3 has a conductivity sensor 4, whose electrodes 40 are in electrical contact with the transmission medium by means of suitable leadthroughs. FIG. 1 shows an arrangement in which the electrodes 40 open into the conduit 33. However, arrangements in which the electrodes 40 open into the first diaphragm volume are also suitable. The latter has the advantage that a broken diaphragm can be detected earlier, since contaminants that penetrate from the diaphragm will have traveled a shorter distance before being detectable.

Instead of the conductivity sensor, a capacitance sensor or a pH meter is equally possible. If a break in the first divider diaphragm occurs during operation of the pressure measuring instrument of the invention, so that contaminants penetrate the first diaphragm volume or the conduit 33, then the changes in property of the transmission medium that are caused as a result are detected by the sensor 4 and output in a suitable way in the form of an electrical signal.

The entire arrangement can now be screwed into suitable connections by means of the thread on the jacket face of the module body 3.

FIG. 2 shows another embodiment, which differs from the first embodiment in the design of the diaphragm module. In this case, the diaphragm module 36 has a module body 37 and a first divider diaphragm 38, with a cross sectional area that is enlarged compared to the corresponding cross-sectional areas of the pressure mediator 2. Otherwise, the mode of operation of the diaphragm module 36 is essentially identical to the mode of operation of the diaphragm module 3. Moreover, arbitrary process connections for the diaphragm module are conceivable.

Optionally, the diaphragm module 36 can already be fixedly mounted by the manufacturer; in that case, the module body 37 can be welded to the base body 20.

The larger surface area of the first divider diaphragm 37 makes it possible to use a greater material thickness, without the first divider diaphragm 37 becoming overly rigid. This is advantageous especially when the pressure measuring instrument is used in aggressive media, because the diaphragm breakage can then be postponed.

What is claimed is:

1. A pressure mediator, including
   a base body;
   a divider diaphragm system, having
   a first divider diaphragm and a second divider diaphragm, between which an intermediate chamber is enclosed in pressuretight fashion, a first surface, remote from said intermediate chamber, of the first divider diaphragm can be acted upon by the pressure prevailing in a first medium, and said first surface, remote from said intermediate chamber, of said second divider diaphragm is oriented toward said base body and is secured by its peripheral region to said base body, forming a pressure chamber between said base body and said second divider diaphragm, and
   said pressure chamber can be filled with a second medium and has a pressure chamber opening, through which the pressure can be transmitted by means of the second medium, and furthermore an exertion of pressure by said first divider diaphragm can be transmitted to said second divider diaphragm via the intermediate volume;
   a sensor, for monitoring a property of said intermediate chamber; and
   a diaphragm module, which has a module body to which said first divider diaphragm is secured by its peripheral region, said module body being secured to said base body.

2. The pressure mediator of claim 1, wherein said sensor for monitoring a property of said intermediate chamber is disposed on said diaphragm module.

3. The pressure mediator of claim 1, wherein said sensor for monitoring a property of said intermediate chamber is one of: a conductivity sensor, a capacitance sensor, and a pH meter.

4. The pressure mediator of one of claim 1, wherein said diaphragm module has a diaphragm bed.

5. The pressure mediator of claim 1, wherein said diaphragm module has an overload protector.

6. The pressure mediator of claim 1, wherein said first divider diaphragm has a larger surface area than said second divider diaphragm.

7. The pressure mediator of claim 1, wherein said second divider diaphragm has a considerably thinner material thickness than said first divider diaphragm and/or comprises less-expensive materials.

8. The pressure mediator of claim 1, wherein said diaphragm module is detachably connected to said base body.

9. A diaphragm module for retrofitting a pressure mediator with a base body and a second divider diaphragm to form a pressure mediator according to one of claims 1–8.

10. A pressure measuring instrument, having a pressure mediator according to one of claims 1–8.

* * * * *